United States Patent
Latvakoski et al.

(10) Patent No.: US 7,200,643 B2
(45) Date of Patent: Apr. 3, 2007

(54) CONTROLLER AND CONTROLLING METHOD THEREOF

(75) Inventors: Juhani Latvakoski, Haukipudas (FI); Aki Tikkala, Oulu (FI); Teemu Vaskivuo, Oulu (FI)

(73) Assignee: Valtion Teknill•Inen Tutkimuskeskus, Espoo (FI)

( * ) Notice: Subject to any disclaimer, the term of this patent is extended or adjusted under 35 U.S.C. 154(b) by 812 days.

(21) Appl. No.: 10/169,132

(22) PCT Filed: Dec. 28, 2000

(86) PCT No.: PCT/FI00/01160

§ 371 (c)(1), (2), (4) Date: Jun. 27, 2002

(87) PCT Pub. No.: WO01/50281

PCT Pub. Date: Jul. 12, 2001

(65) Prior Publication Data

US 2002/0193145 A1 Dec. 19, 2002

(30) Foreign Application Priority Data

Dec. 29, 1999 (FI) .................................. 19992808

(51) Int. Cl.
*G06F 15/16* (2006.01)
(52) U.S. Cl. ............. 709/217; 340/853.3; 348/14.05; 348/152; 348/211.99; 348/211.4
(58) Field of Classification Search ............. 709/203, 709/223–225, 217–218; 340/853.2–853; 348/14.02–14.03, 14.05, 152–153
See application file for complete search history.

(56) References Cited

U.S. PATENT DOCUMENTS

| 5,886,738 | A | * | 3/1999 | Hollenbeck et al. ........ 348/151 |
| 5,890,155 | A | | 3/1999 | Steinman et al. |
| 5,982,445 | A | * | 11/1999 | Eyer et al. ................... 348/461 |

(Continued)

FOREIGN PATENT DOCUMENTS

EP 0 825 506 2/1998

(Continued)

OTHER PUBLICATIONS

Jini™ Architectural Overview, Sun Microsystems, Inc. Jan. 1999 retrieved from the Internet: <URL: www.sun.com>.

*Primary Examiner*—Bunjob Jaroenchonwanit
*Assistant Examiner*—Duyen Doan
(74) *Attorney, Agent, or Firm*—Young & Thompson

(57) ABSTRACT

A controller, a system, and a method of controlling the operation of the controller of an electric device. The method comprises: sending a user interface software packet stored in the controller's memory to a first external device; disassembling the user interface software packet in the first external device into executable user interface server software and user interface client software; sending the user interface client software from the first external device to a second portable external device; the user interface client software communicating with the user interface server software via a wireless radio connection between the first external device and the second portable external device; the user interface server software converting the commands issued by the user interface client software and transferring the commands to the controller's interface; and the controller executing an operation according to the converted command received via its interface.

20 Claims, 4 Drawing Sheets

U.S. PATENT DOCUMENTS

| | | | |
|---|---|---|---|
| 6,005,861 A * | 12/1999 | Humpleman | 370/352 |
| 6,081,519 A * | 6/2000 | Petler | 370/356 |
| 6,148,346 A * | 11/2000 | Hanson | 719/321 |
| 6,167,120 A * | 12/2000 | Kikinis | 379/90.01 |
| 6,430,599 B1 * | 8/2002 | Baker et al. | 709/203 |
| 6,545,587 B1 * | 4/2003 | Hatakeyama et al. | 340/3.31 |
| 6,947,156 B1 * | 9/2005 | Jeyachandran et al. | 358/1.15 |
| 6,988,123 B2 * | 1/2006 | LeClair et al. | 709/201 |
| 6,996,613 B1 * | 2/2006 | Schroder | 709/224 |
| 7,039,858 B2 * | 5/2006 | Humpleman et al. | 715/501.1 |
| 2001/0011284 A1 * | 8/2001 | Humpleman et al. | 707/511 |
| 2001/0051863 A1 * | 12/2001 | Razavi et al. | 703/23 |
| 2002/0103897 A1 * | 8/2002 | Rezvani et al. | 709/224 |

FOREIGN PATENT DOCUMENTS

| | | |
|---|---|---|
| EP | 0 987 628 | 3/2000 |
| WO | WO 99/57839 | 11/1999 |
| WO | WO 99/60487 | 11/1999 |
| WO | WO 00/21200 | 4/2000 |

* cited by examiner

CONTROLLER AND CONTROLLING METHOD THEREOF

FIELD

The invention relates to a simple controller, such as a switch or an adjuster, which is remote controllable using a data transfer connection. The controller is usable for controlling an electronic device connected to the controller, for example a lamp or a more complex device, such as a refrigerator, a freezer or an electric stove.

BACKGROUND

Controllers usually have only a physical user interface. For example, a light switch has a manual switch, which is usually implemented mechanically. Controllers are currently developed for remote control of an electronic device over a data transfer connection.

If the controller has a controlling computer, then the controllers required for device control are installable directly to the controlling computer from for example a diskette or a laser disc. This solution requires manual work, something that is not desirable in future automatically generated networks of devices and services, i.e. ad hoc networks. Network maintenance is also laborious.

On the other hand, solutions exist wherein the controller contains server software serving it. A usual Internet connection mechanism requires the TCP/IP protocol (Transmission Control Protocol/Internet Protocol). In addition, a Java virtual machine is often needed as a base for the user interface, since it enables portability of the user interface. Such a controller is too expensive to make, since the microprocessors comprised by it must possess a relatively high processing power.

For example Jini, developed by Sun, is a technology utilizing the Java programming language and enabling automatic generation of ad hoc networks. However, Jini is intended for relatively expensive devices, e.g. computers, laser printers, telephones and digital cameras, which include the necessary processing power. Registering a controller's user interface in an ad hoc network often requires running a Java programming language virtual machine in the controller. This is difficult to implement at a reasonable cost efficiency for simple controllers. However, it would be extremely desirable to be able to use the user interface of a controller over a data transfer connection, for example a wireless network or the Internet.

To summarize, known solutions are too expensive or difficult to maintain.

BRIEF DESCRIPTION

The object of the invention is to provide an improved controller. As an aspect of the invention, the controller is provided. As another aspect of the invention, the method of controlling the operation of a controller is also provided. Other preferred embodiments of the invention are also disclosed.

As an aspect of the invention, there is provided a method of controlling the operation of a controller of an electric device, the method comprising: sending a user interface software packet stored in the controller's memory to a first external device; disassembling the user interface software packet in the first external device into executable user interface server software and user interface client software; sending the user interface client software from the first external device to a second portable external device; the user interface client software communicating with the user interface server software via a wireless radio connection between the first external device and the second portable external device; the user interface server software converting the commands issued by the user interface client software and transferring the commands to the controller's interface; and the controller executing an operation according to the converted command received via its interface.

As an aspect of the invention, there is provided a system for controlling the operation of an electric device, the system comprising a controller connected or connectable to the electric device, the controller comprising control means for controlling the operation of the electric device, data transfer means for transferring data between the controller and a first external device external to the controller, an interface communicating with the control means, and a memory, and a user interface software packet is stored in the memory, the user interface software packet being transmissible using the data transfer means for disassembly in the first external device, the user interface software packet, when disassembled, comprising user interface server software and user interface client software, when executed, the user interface client software communicating with the user interface server software, and the user interface server software converting commands issued by the user interface client software to be transmitted to the controller interface via the data transfer means, and the system further comprises the first external device and a second portable external device that is connected to the first external device via a wireless radio connection, and the user interface server software is executed in the first external device, and the user interface client software is executed in the second portable external device.

The invention is based on the idea that the controller itself only requires little processing power for executing a simple interface. The actual server software and the client software of the user interface are executed in a device separate from the controller, such as the user's home computer.

The invention enables electronic devices to be made remote controlled with low resources.

LIST OF THE FIGURES

In the following, the preferred embodiments of the invention will be described by way of example with reference to the accompanying drawings, in which FIG. 1 shows an example of implementing a controller;

DESCRIPTION OF EMBODIMENTS

Figure 1:
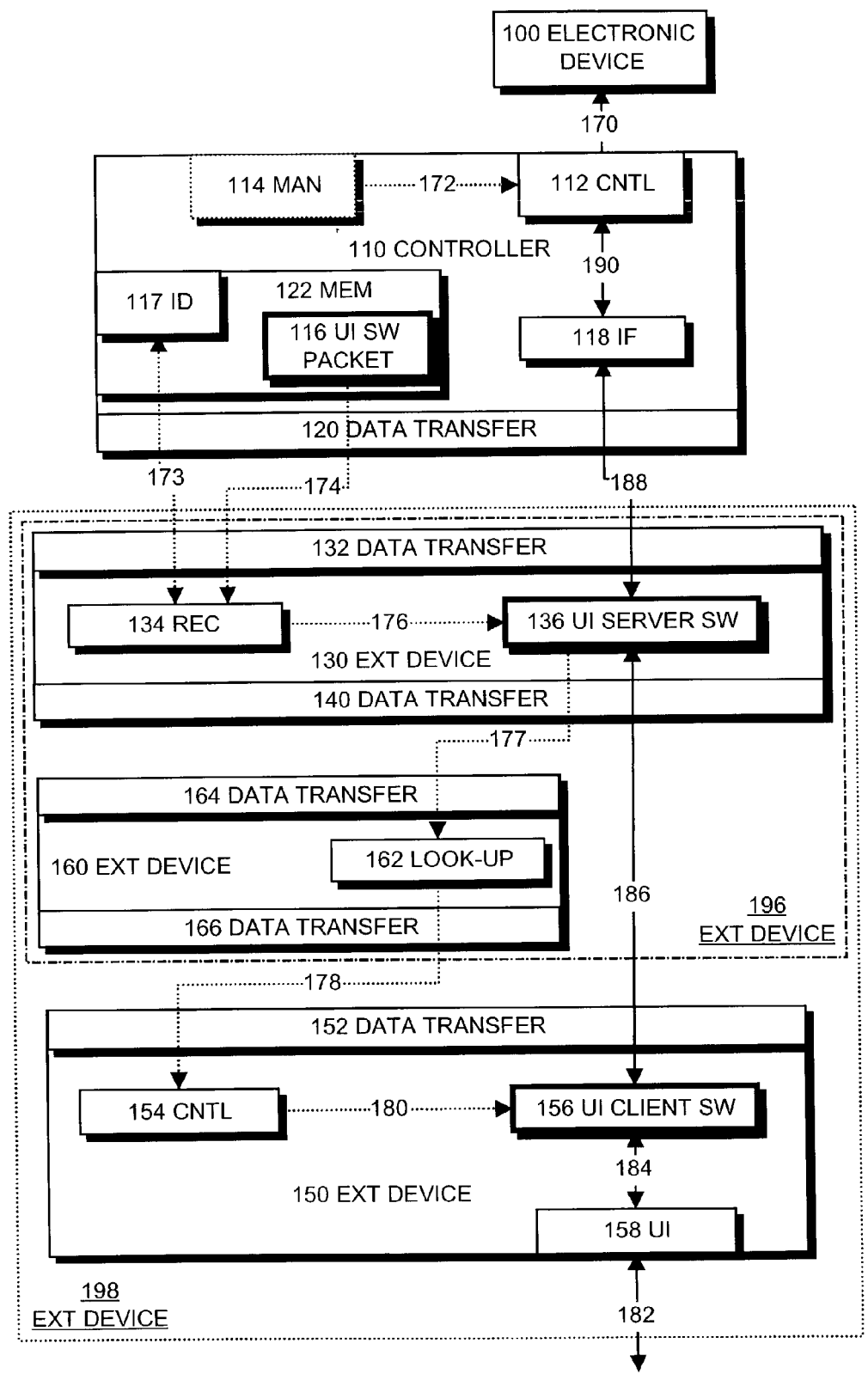

FIG. 1 shows an example of the structure of a controller. The controller 110 comprises control means 112 for controlling 170 the operation of an electronic device 100 connected or connectable to the controller 110. Thus, the controller 110 may be a device separate from the electronic device 100 or the controller 110 may be integrated into the electronic device 100.

The control means 112 are typically implemented with a relatively inexpensive microprocessor having quite low processing power. The controller 110 may also comprise manual control, e.g. a mechanical switch 114 or a touch switch for local control 172 of the controller 110.

The controller further comprises data transfer means 120 for transferring data between the controller 110 and a separate device 130 external to the controller 110. The data transfer means 120 can be implemented using e.g. a series cable, a local area network, a short-range radio transmitter or any other known way to implement a data transfer connection.

The external device 130 may be e.g. a usual home computer, a car computer or a set-top-box. It is essential that the controlling computer 130 possess enough processing power and memory to allow the necessary protocols (e.g. TCP/IP) and, optionally, a Java virtual machine to be run therein. The manager of the devices and services in the ad hoc network, i.e. a look-up service 162 (e.g. Jini Look-Up Service), may be located either in the controlling computer 130 or in another computer 160, which has a data transfer connection to the controlling computer 130. The actual remote control can then be implemented via the controlling computer 130 or by means of a second external device 150 communicating with the controlling computer 130. Device 150 also has a connection to device 160. In principle, the connection from device 150 to device 130 can pass via device 160. Said second external device 150, e.g. a remote control, a mobile telephone or a portable computer, may be located anywhere from where there is a local (e.g. a short-range radio connection using the Bluetooth technology) connection to the controlling computer or a connection via a public mobile telephone network, e.g. GMS/GPRS (Global System for Mobile Communications/General packet Radio Service), UMTS (Universal Mobile Telephone System) or via a fixed network to the Internet, via which a connection exists to the first external device 130. Said technologies are only examples of usable access technology; any technique known to a person skilled in the art can be used in the data transfer.

The controller also comprises memory 122, in which a user interface software packet 116 and controller identifier data 117 are stored. The user interface software packet 116 can be sent 174 by means of the data transfer means 120 for disassembly in the external device 130. The external device 130 comprises a processing program 134 for disassembling the received packet 116. The identifier data 117 can belong to the user interface software packet 116 or they may be sent separately from it.

In an embodiment, the system may also comprise a data storage external to the controller 110 for storing the user interface software packets 116 transferred from the controllers 110. The packets in the data storage can be matched with the controllers 110 by means of service-specific identifier data to be described later. Herein, the external device 130 obtains the software packet 116 of the controller 110 either by transferring it from the controller 110 or from the data storage. The controller 110 transmits its service-specific identifier data 117 before the software packet 116 is transmitted. The external device 130 matches the controller 110 with the software packet 116, which may be in the data storage. If the software packet 116 is not yet in the data storage, the software packet 116 is transferred to the device 130 from the controller 110. The software packet 116, transferred from the controller 110, is stored in the data storage so that it can later be retrieved based on the service-specific identifier 117.

The controller 110 registers automatically in a local, dynamically created network of devices and services, which is created for example under the control of Jini or some other vendor-dependent or vendor-independent service mechanism. A client requiring control or monitoring of the controller 110 is able to use the service mechanism to load the controller's user interface to his display over any switching network. The user interface can be used to give control commands to the controller 110 and to monitor its state over a data transfer connection.

The processing program 134 of the user interface software packet 116 comprised by the external device 130 checks the received user interface software packet 116, and disassembles 176 user interface server software 136 from the user interface software packet 116.

Disassembled, the user interface software packet 116 comprises the user interface server software 136 and user interface client software 156 to be executed in the external device 130. The user interface client software 156 communicates 186 with the user interface server software 136. The user interface server software 136 converts the commands issued by the user interface client software 156 to be transmitted 188 to the interface 118 of the controller 110 via the data transfer means 120. In addition to mere commands, the controller 110 may be inquired about its state using the described mechanism, whereby the user interface server software 136 converts the data transmitted by the interface 118 into data that the user interface client software 156 is able to understand. The same mechanism can be used for acknowledging the transmitted commands.

In an embodiment, the external device 160 comprises a look-up service 162 that dynamically keeps a record of the controllers 110, for example by implementing the Jini Look-up Service. The controller 110 registers in the look-up service 162 in such a way that the user interface server software 136 of the controller 110 registers in the look-up service 162. This registering takes place for example by the user interface server software 136 transmitting 177 a user interface client software 156 instance it created to the look-up service 162.

The user interface software packet 116 and accordingly the user interface client software 156 instance contain the identifier data 117 of the controller 110. The identifier data 117 are composed of an optional static producer-specific controller 110 number and a dynamic service-specific controller 110 identifier. The existence of the producer-specific number depends on the producer and is thus an optional feature of the controller 110. The dynamic service-specific identifier may be generated by some known mechanism based for example on the IP address and time.

The controller 110 may comprise means enabling a person to set the identifier data 117 to the default value during installation of the controller 110. The means may be implemented for example with a push switch whose pushing the control means 112 detect. Dynamic parts of the identifier data can be set to the default value, i.e. typically an empty value.

If the identifier data 117 on the controller 110 are default values, the processing program 134 generates the identifier data for the controller 110. The identifier data 117 are sent to the controller 110 over a data transfer connection 173 as an acknowledgement of the user interface software packet 116. The controller 110 stores the received identifier data in its memory 122. The controller 110 may include the identifier data 117 in the user interface software packet 116.

In an embodiment, the user interface server software 136 is implemented in a first external device 130, the look-up service 162 in a second external device 160, and the user interface client software 156 in a third external device 150. This embodiment is particularly well suitable for extensive ad hoc networks.

In an embodiment, the user interface server software 136 and the look-up service 162 are executed in the same external device 196, and the user interface client software 156 in a separate external device 150. The external device 196 is composed of the functionalities of the external devices 130 and 160. In FIG. 1, the external device 196 is surrounded by a dash-and-dot line. An embodiment is also feasible, wherein the user interface server software 136, the look-up service 162 and the user interface client software 156 are executed in one external device 198. The external device 198 is composed of the functionalities of devices 130, 150 and 160. In FIG. 1, the external device 198 is surrounded by a dotted line. The last two embodiments are preferable for example at home, where the user typically has only one computer and optionally a separate remote control.

If the user interface server software 136, the look-up service 162 and the user interface client software 156 each are executed in a separate external device 130, 150, 160, then the user interface server software 136 is executed in the first external device 130, and the third external device 150 loads 178 the user interface client software 156 for execution from the look-up service 162 of the second external device. In this case, a data transfer connection exists from the first external device 130 to the controller 110, to the second external device 160 and to the third external device 150. The means for setting up a data transfer connection in the first external device 130 may be separate 132, 140 or the same. The second external device 160 comprises data transfer means 164, 166. The third external device 150 also comprises data transfer means 152. A control part 154 in the third external device 150 attends to the transfer 178 of the user interface client software 156 and its installation 180 for execution in the third external device 150. The third external device 150 also comprises a user interface 158, e.g. a keyboard and a display, via which the user gives commands 182 to the controller 110 and receives information 182 on the operation of the controller 110. The user interface client software 156 can also act as an interface/driver for the user interface software 158 running in the third device 150.

Figure 2:
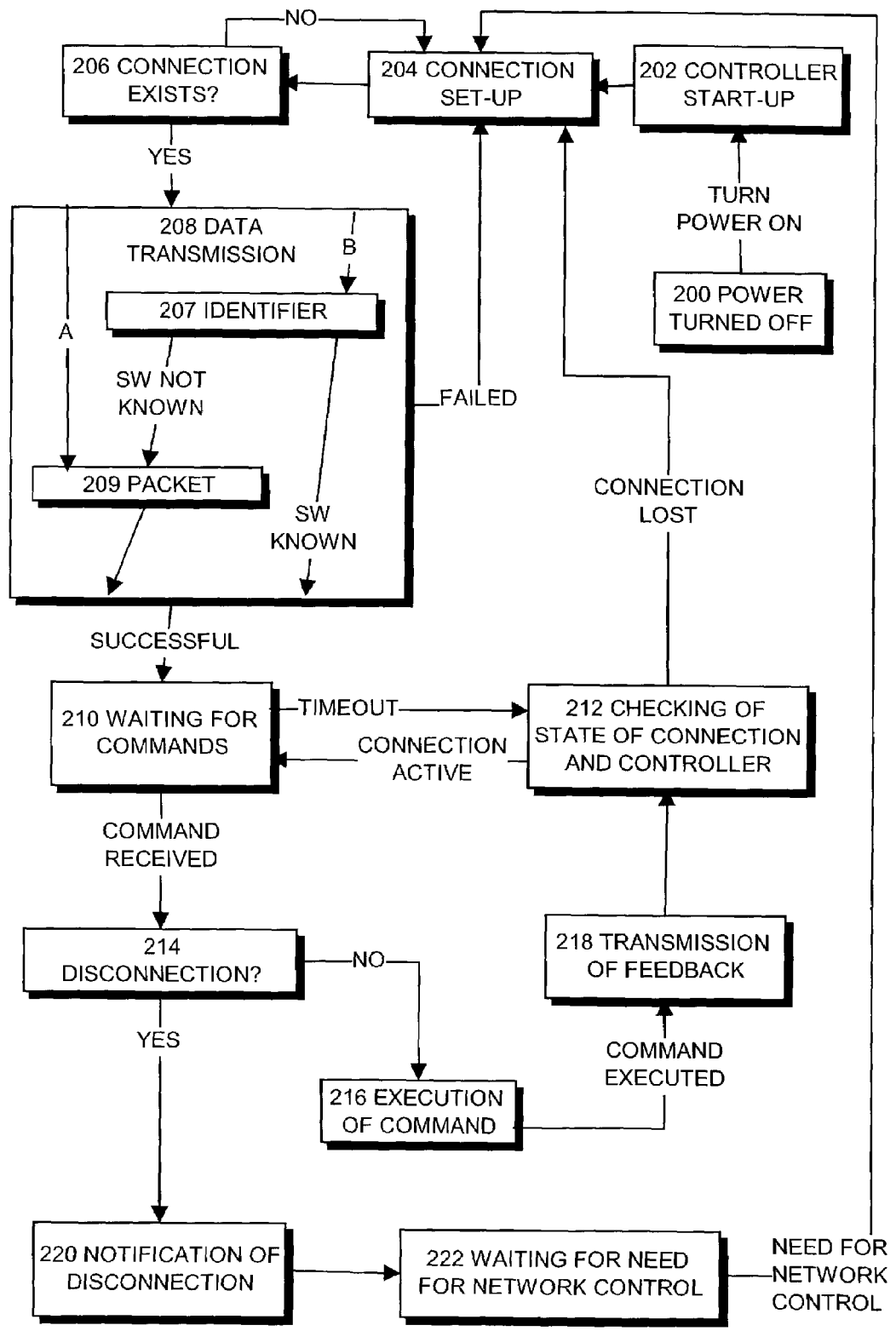
FIG. 2 shows the operation of a controller.

FIG. 2 is a functional diagram of the controller 110. At first, the power of the controller is off 200. When power is turned on, possibly by means of a manual user interface 114, state 202 is next, wherein the controller 110 is started up. Start-up refers to the start-up of the control means 112, whereby for example the necessary data are transferred to the random access memory of the control means 112.

State 204 is next, wherein an attempt is made to set up a connection to the external device 130. When the controller 110 is connected to the controlling computer 130, the controlling computer 130 immediately identifies the connecting and starts to wait for data from the controller 110. Having been connected, the controller 110 starts to send the user interface software packet 116, which includes the user interface server software 136 and the user interface client software 156, which are needed for controlling said controller 110 and which may be e.g. Java classes in a JAR (Java Archive) packet. Another alternative is that having been connected, the controller 110 starts to transmit its identifier data 117, and the controller 110 does not sent the user interface software packet 116 until it is required to do so.

State 206 checks the state of connection set-up. If no connection is set up yet, the process goes back to state 204, wherein a new attempt is made to set up a connection.

Once a connection is set up, the process goes from state 206 to state 208, wherein the controller 110 sends information. In state 208 the process is along the path indicated by either arrow A or arrow B. Arrow A describes an alternative, wherein transmission of the identifier data 117 is not separately in use, and arrow B describes an alternative, wherein transmission of the identifier data 117 and storing the user interface software packet 116 in the data storage are in use.

When path A is used, in state 208 substate 209 is entered, wherein the user interface software packet 116 and the identifier data 117 are sent to the external device 130.

Path B leads to substate 207 of state 208, wherein the identifier data 117 on the controller 110 are sent 173 to the external device 130. Device 130 responds to a successful transmission of the identifier data 117 by an acknowledgement 173, wherein it can request that the controller 110 send its user interface software packet 116. The device 130 only has to ask for transmission of the user interface software packet 116 if the necessary software is not already at its disposal. The process proceeds from substate 207 to state 210 provided the software is available, otherwise to substate 209, wherein the controller 110 sends the user interface software packet 116 to device 130. Device 130 responds to successful transmission of the user interface software packet 116 with an acknowledgement, which may include a service-specific identifier 117 generated for the service. If the acknowledgement of device 130 includes a service-specific identifier 117, then the controller 110 stores the identifier data in its memory 122.

If transmission of the identifier data 117 or the packet 116 fails, the process returns to state 204, and a new connection is set up. The return to state 204 does not have to be immediately after the first transmission failed, but a predetermined number of retransmissions may be performed before that. Information on successful transmission is received by the external device 130 sending an acknowledgement to the controller 110.

Figure 3:
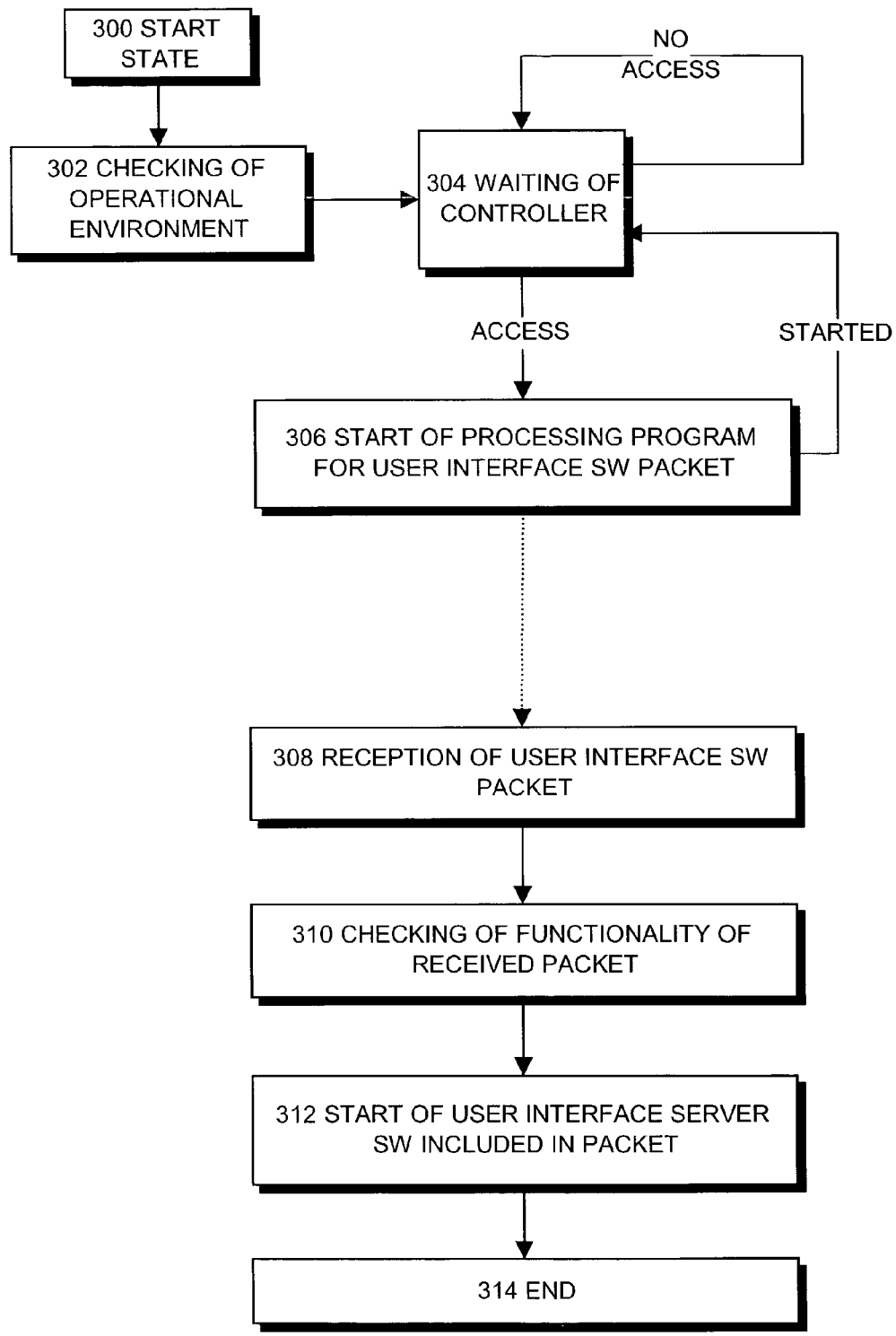
FIG. 3 shows how a controller registers in an external device.

Once the user interface software packet 116 is transferred from the controller 110 or the data storage to the controlling computer 130, the controlling computer 130 initiates the necessary validation tests on the optionally loaded packet, the tests serving to verify that the contents of the packet are harmless. FIG. 3 shows this in more detail.

The user interface server software 136 then starts and verifies the state of the controller 110 by producer-specific handshaking and moves to wait for contacts from clients.

After the validation tests, the loaded device service and the user interface start to register as a service in the ad hoc network (e.g. connection to Jini network).

After successful transmission, the process goes from state 208 to state 210, wherein the controller 110 starts to wait for commands 188 from the external device 130. Naturally, commands can also be issued via the local manual user interface 114 of the device. The control means 112 may take checking measures at given intervals.

If a command is not received within a predetermined time, the process goes to state 212, wherein the state of the controller 110 and the state of the data transfer connection are checked. If the data transfer connection to the external device 130 is lost, the process returns to state 204, wherein the set-up of a new connection starts. If a change in the state of the controller 110 is detected, then it can be notified to the external device 130, which notifies it further to the other external devices 150, such as remote controllers. If the data transfer connection to the external device is in condition, then the process returns from state 212 to state 210.

If a command is received in state 210, the process goes to state 214, wherein a check is made to see if a disconnection command is involved, i.e. if the controller 110 is being disconnected from the ad hoc network. If a disconnection command is involved, the process goes from state 214 to state 220, wherein the disconnection is notified to the look-up service 162 and communication with it ends. When notifying the disconnection to the look-up service 162, the controller 110 notifies an acknowledgement to the disconnection command to the user interface server software 136 and stops communicating with it; in this case the user interface server software 136 communicates a disconnection command to the look-up service 162, whereby the look-up service 162 disconnects the service from the supply of the look-up service 162. The next state is 222, wherein the need for network control is waited for. Once such a need is detected, e.g. an adjustment performed with the manual switch 114 is detected at the control means 112, then the next state is 204, wherein a data transfer connection starts to be set up.

If the command received in state 210 was not a disconnection command performed in the test in state 214, then the process goes from state 214 to state 216, wherein the command received is executed in the controller 110, i.e. a given function is performed in the electric device 100 via the control means 112.

Once the command is fully executed, the process goes from state 216 to state 218, wherein feedback about the executed command is sent to the first external device 130, if need be, and via the first external device 130 to any other external devices 150, such as remote controls.

After transmission of any feedback, the process goes from state 218 to state 212, wherein the states of the connection and the controller are again checked. From here on, the process is as described above.

FIG. 3 shows how the controller 110 registers in the external device 130. State 300 is an initial state, wherein the external device is started. After the start, the next state is 302, wherein the operational environment is checked, i.e. connections to look-up services 162 and data transfer connections via which the controller 110 can set up a connection to said device 130 are checked.

The next state is 304, wherein the registration of the controller 110 is waited for using some free data transfer connection. The wait can be implemented as an interrupt control or polling type of wait. In case there is no access, state 304 is not left, but the waiting continues. Once an access finally arrives, the next state is 306, wherein the processing program 134 for processing the user interface software packet 116 sent by the controller 110 or retrieved from the data storage is started. After the start, state 304 is re-entered and the registration of some other controller is waited for.

State 306 triggers off state 308, wherein the user interface software packet 116 is received using a suitable data transfer method. The user interface software packet 116 is stored in an optionally available data storage, from where the user interface software packet 116 can be localized by means of the service-specific identifier 117. The data included in the packet 116 is stored in the device 130 and any compression is removed.

After state 308 the next state is 310, wherein the functionality of the received packet 116 is checked, i.e. the user interface server software 136 included in the disassembled packet 116 is found to be suitable for execution in the external device 130, and the user interface client software 156 included in the disassembled packet is found to be suitable for distribution via the look-up service 162.

State 310 is succeeded by state 312, wherein the user interface server software 136 is started. Execution ends in state 314.

Figure 4:
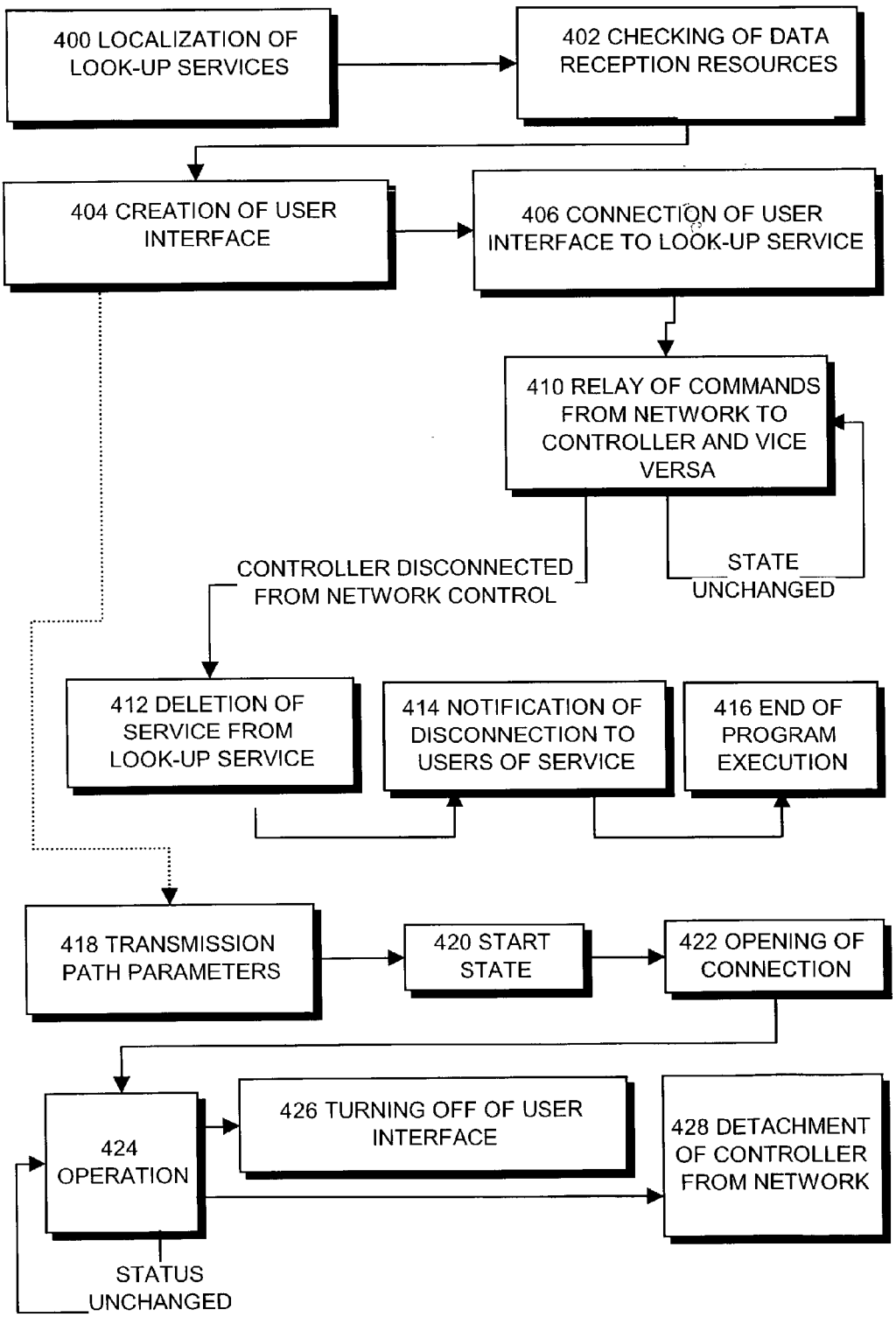
FIG. 4 shows controller control using software included in a user interface software packet.

FIG. 4 shows control of the controller using the software comprised by the user interface software packet 116, i.e. the user interface server software 136 and the user interface client software 156. The external device 150 connects to the look-up service 162 of the services of the ad hoc network in order to find the services in said network, and particularly the controller 110 that the user wants to control and/or monitor in this particular case. Before the user gains access to the network services, he performs an accurately specified identification procedure to guarantee sufficient security and prevent misuse. Once the service is finally found, the user loads the service's user interface client software 156 to his device 150. When the user makes choices using the user interface client software 156 of the controller 110 loaded to the display, the commands issued are transferred to the user interface server software 136 of the controller 110 in the controlling computer 130. The user does not necessarily have to know via which path said commands are transferred. Data may be transferred for example over a Bluetooth or other local data link or any public network and the Internet. The user interface server software 136 transfers the commands it considers acceptable further to the controller 110.

At first, in state 400, the look-up services 162 are localized, i.e. the look-up services 162 in the network are accounted for and a decision is made upon registering therein. The next state is 402, wherein data reception resources are checked, i.e. a transmission path 186 capable of reception is reserved in the computer 130 for listening and transmission. The properties of the reception path are also checked, so that a connection can be set up thereto from any network part.

State 402 is succeeded by state 404, wherein a user interface is created, i.e. an instance is created from the user interface client software 156 included in the packet, using which the controller 110 will be controlled via the user interface server software 136. The characteristics of the reception path 186 created in the computer 130 that received the packet are added to said instance in order for the instance to be able to use them for connection set up when starting. The next state is 406, wherein the user interface is attached to the look-up service 162, i.e. the instance created in state 404 and provided with the necessary data is attached to the look-up service 162.

State 406 is succeeded by state 410, wherein commands coming from the network are relayed. The user interface server software 136 listens to the reserved reception path 186 and transfers the data from the network further to the controller 110 and feedback data from the controller 110 to users requiring them. The users of the service are registered at this point. The user interface server software 136 transfers commands until the controller 110 is disconnected from network control. The process then proceeds from state 410 to state 412, wherein the service is deleted from the look-up service 162, i.e. the instance created is deleted from the look-up service 162 in which it is registered.

State 412 is succeeded by state 414, wherein a notification of the disconnection is given to the users of the service, i.e. the external devices 150 that started the user interface client software 156 are cautioned about the disconnection of the transmission path, or automatic shutdown is started in them.

State 414 is succeeded by state 416, wherein the execution of the program is stopped, i.e. the user interface server software 136 in the external device 130 providing the network connection is shut down and the reserved transmission path and other resources used are released.

In the external device 150, execution starts from state 420, wherein the user interface client software 156 is transferred from the look-up service 162 to the device 150 using the service. The parameters of the transmission path used by the user interface server software 136 are stored in said user interface client software 156 before it registers in the look-up service. This s depicted by the triggering performed by state 404 on state 418, in which state 418 the parameters, e.g. IP address, port, and other necessary data on the transmission path 186, are stored.

State 420 is succeeded by state 422, wherein a connection is opened, i.e. the user interface client software 156 is started, and a connection 186 to the user interface server software 136 is opened. If need be, tests may be performed for verifying that the control operates.

State 422 is succeeded by state 424, wherein the actual operation is started. If the state of the controller 110 does not change or the user interface client software 156 is not shut down, then the commands issued by the user or the system are delivered to the controller 110 over the transmission path via the user interface server software 136.

If the user interface client software 156 is shut down, then the process proceeds from state 424 to state 426, wherein the user interface server software 136 located in the device 130 attending to the transfer task is notified of the disconnection of the control in order that the data on the number of controlling devices 150 remains updated.

If the controller 110 is disconnected from the network, this is notified to the user of the external device 150, such as the user of a remote control. In addition, other necessary measures are taken, such as the termination of the execution of the user interface client software 156.

The above-described rather complex operating logic can be simplified into a method of controlling the operation of a controller 110. In the method, a user interface software packet 116 stored in the memory of the controller 110 is sent to an external device 130. The user interface software packet 116 is then disassembled into user interface server software 136 and user interface client software 156 to be executed in at least one external device 130, 150. The user interface client software 156 communicates with the user interface server software 136, and the user interface server software 136 converts the commands issued by the user interface client software 156 and transfers the commands to an interface 118 in the controller 110. The controller 110 executes the operation according to the converted command received via the interface 118.

The embodiments described are preferably implemented as software, whereby the control means 112, the data transfer means 120 and the interface 118 are programs executable with a microprocessor. Partial hardware implementation is also feasible, particularly using asic (application specific integrated circuit). Furthermore, the data transfer means 120 may require special hardware parts, e.g. a short-range radio transmitter. The user interface software packet stored in the memory is also composed of executable software or its source code, e.g. Java classes, executable in the microprocessor of the external device 130, 150.

Even though the invention is described above with reference to the example according to the accompanying drawings, it is to be understood that the invention is not restricted thereto, but can be modified in a variety of ways within the scope of the inventive idea disclosed in the attached claims.

We claim:
1. A controller comprising: control means for controlling an operation of an electric device, connected or connectable to the controller; data transfer means for transferring data between the controller and a first external device external to the controller, said first external device being distinct from said electronic device; an interface communicating with the control means; and a memory, a user interface software packet being stored in the memory, the user interface software packet being sent, using the data transfer means, for disassembly in the first external device, the user interface software packet, when disassembled, comprising user interface server software and user interface client software, when executed, the user interface client software communicating with the user interface server software, and the user interface server software converting commands issued by the user interface client software to be transmitted to the controller interface via the data transfer means, wherein the first external device connects to a second portable external device via a wireless radio connection and sends the user interface client software to said second portable external device, the user interface server software being executable in the first external device, and the user interface client software being executable in the second portable device.

2. A controller as claimed in claim 1, wherein the first external device comprises a processing program for the received user interface software packet, the processing program checking the received user interface software packet and disassembling the user interface server software from the user interface software packet.

3. A controller as claimed in claim 1, wherein an external device comprises a service mechanism that dynamically keeps a record of the controller.

4. A controller as claimed in claim 3, wherein the controller's user interface server software registers in the service mechanism.

5. A controller as claimed in claim 4, wherein the user interface server software registers in the service mechanism by transmitting a user interface client software instance it created to the service mechanism.

6. A controller as claimed in claim 5, wherein the user interface client software instance comprises identifier data on the controller.

7. A controller as claimed in claim 6, wherein the controller comprises means for setting the identifier data to a default value.

8. A controller as claimed in claim 6, wherein if the identifier data stored in the controller memory are default values, then the processing program generates identifier data for the controller, the identifier data are sent to the controller using a data transfer connection as an acknowledgement of the user interface software packet, and the controller stores the identifier data in its memory.

9. A controller as claimed in claim 3, wherein:
the service mechanism is executed in a third external device, or the service mechanism is executed in the first external device.

10. A controller as claimed in claim 1, wherein the data transfer means is a radio transceiver.

11. A system for controlling an operation of an electronic device, the system comprising a controller connected or connectable to the electric device, the controller comprising control means for controlling the operation of the electronic device, data transfer means for transferring data between the controller and a first external device external to the controller, said first external device being distinct from said electronic device; an interface communicating with the control means; and a memory, a user interface software packet being stored in the memory, the user interface software packet being sent, using the data transfer means, for disassembly in the first external device, the user interface software packet, when disassembled, comprising user interface server software and user interface client software, when executed, the user interface client software communicating with the user interface server software, and the user interface server software converting commands issued by the user interface client software to be transmitted to the controller interface via the data transfer means, wherein the first external device connects to a second portable external device via a wireless radio connection and sends the user interface client software to said second portable external device, the user interface server software being executed in the first external device, and the user interface client software being executed in the second portable external device.

12. A system as claimed in claim 11, wherein the first external device comprises a processing program for the received user interface software packet, the processing program checking the received user interface software packet and disassembling the user interface server software from the user interface software packet.

13. A system as claimed in claim 11, wherein an external device comprises a service mechanism that dynamically keeps a record of the controllers.

14. A system as claimed in claim 13, wherein the controller's user interface server software registers in the service mechanism.

15. A system as claimed in claim 14, wherein the user interface server software registers in the service mechanism by transmitting a user interface client software instance it created to the service mechanism.

16. A system as claimed in claim 15, wherein the user interface client software instance comprises identifier data on the controller.

17. A system as claimed in claim 16, wherein the controller comprises means for setting the identifier data to a default value.

18. A system as claimed in claim 16, wherein if the identifier data stored in the controller memory are default values, then the processing program generates identifier data for the controller, the identifier data are sent to the controller using a data transfer connection as an acknowledgement of the user interface software packet, and the controller stores the identifier data in its memory.

19. A system as claimed in claim 13, wherein the service mechanism is executed in a third external device, or the service mechanism is executed in the first external device.

20. A system as claimed in claim 11, wherein the data transfer means is a radio transceiver.

* * * * *

UNITED STATES PATENT AND TRADEMARK OFFICE
CERTIFICATE OF CORRECTION

PATENT NO. : 7,200,643 B2  Page 1 of 1
APPLICATION NO. : 10/169132
DATED : April 3, 2007
INVENTOR(S) : Juhani Latvakoski et al.

It is certified that error appears in the above-identified patent and that said Letters Patent is hereby corrected as shown below:

On the title page, assignee, Item (73), change "Valtion Teknill•Inen Tutkimuskeskus" to --Valtion Teknillinen Tutkimuskeskus--.

Signed and Sealed this

Tenth Day of July, 2007

JON W. DUDAS
*Director of the United States Patent and Trademark Office*